US008760013B2

(12) United States Patent
Esenwein

(10) Patent No.: US 8,760,013 B2
(45) Date of Patent: Jun. 24, 2014

(54) HAND-HELD POWER TOOL WITH A DRIVE MOTOR AND A GEAR MECHANISM

(75) Inventor: Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 13/388,987

(22) PCT Filed: Jul. 19, 2010

(86) PCT No.: PCT/EP2010/060435
§ 371 (c)(1), (2), (4) Date: Apr. 11, 2012

(87) PCT Pub. No.: WO2011/015450
PCT Pub. Date: Feb. 10, 2011

(65) Prior Publication Data

US 2012/0187782 A1 Jul. 26, 2012

(30) Foreign Application Priority Data

Aug. 5, 2009 (DE) ........................ 10 2009 028 247

(51) Int. Cl.
*H02K 7/14* (2006.01)

(52) U.S. Cl.
USPC ............................................ 310/50; 310/53

(58) Field of Classification Search
USPC ........................ 310/50, 43, 216.001–216.137
See application file for complete search history.

(56) References Cited

U.S. PATENT DOCUMENTS 4,260,916 A * 4/1981 Theissig ......................... 310/50
5,253,382 A * 10/1993 Beny .............................. 15/22.1

FOREIGN PATENT DOCUMENTS

DE 39 22 552 A1 1/1991
DE 10 2006 020 172 A1 11/2007
WO 2004/016399 A1 2/2004

OTHER PUBLICATIONS

International Search Report corresponding to PCT Application No. PCT/EP2010/060435, mailed Oct. 12, 2010 (German and English language document) (6 pages).

* cited by examiner

*Primary Examiner* — Hanh Nguyen
(74) *Attorney, Agent, or Firm* — Maginot, Moore & Beck

(57) ABSTRACT

A hand-held power tool with a drive motor and a gear mechanism has elastomer elements molded onto the inner side of the housing. At least two elastomer elements form elastomer bearings for bearing the drive motor.

18 Claims, 4 Drawing Sheets

HAND-HELD POWER TOOL WITH A DRIVE MOTOR AND A GEAR MECHANISM

This application is a 35 U.S.C. §371 National Stage Application of PCT/EP2010/060435, filed on Jul. 19, 2010, which claims the benefit of priority to Serial No. DE 10 2009 028 247.5, filed on Aug. 5, 2009 in Germany, the disclosures of which are incorporated herein by reference in their entirety.

The disclosure relates to a hand-held power tool with a drive motor and a gear mechanism.

BACKGROUND

DE 10 2006 020 172 A1 describes a hand-held power tool which has an electric drive motor in a housing, the drive movement of said drive motor being transmitted to the tool by means of a gear mechanism. The electric drive motor is accommodated in a motor housing which is connected to a gear mechanism housing for accommodating the gear mechanism. A sealing element is located in the region of the join between the motor housing and the gear mechanism housing, said sealing element comprising two half-rings which are composed of a thermoplastic elastomer which is molded on the end face of the motor housing adjacent to the region of the join. The half-rings also serve to damp the gear mechanism and to seal off the gear mechanism compartment from the motor compartment.

SUMMARY

The disclosure is based on the object of reducing vibrations in a hand-held power tool by way of simple measures.

According to the disclosure, this object is achieved by virtue of the features set forth below. Expedient developments are also set forth below.

The hand-held power tool according to the disclosure is a hand-controlled power tool with a drive motor which is arranged in a motor housing, in particular with an electric drive motor which is coupled to a gear mechanism by means of which the drive movement of the motor is transmitted to the tool which is to be driven. A movement-transmitting unit is arranged between the drive motor and the gear mechanism, the drive motor and the gear mechanism being at least partially decoupled by means of said unit. Decoupling takes place in the axial direction, that is to say in the direction of the longitudinal axis of the motor, and/or in the radial direction, that is to say transverse to the longitudinal axis of the motor. In particular, at least partial vibration decoupling is achieved by means of the movement-transmitting unit. However, tolerance compensation is also possible by means of the unit, for example in such a way that deviations in the coaxial orientation of axes of the motor and of the gear mechanism can be compensated for by means of the unit.

Furthermore, it is provided, according to the disclosure, that at least two elastomeric elements are molded onto the inner face of the motor housing, said elastomeric elements forming elastomeric bearings for bearing the drive motor in the motor housing. The motor can be mounted in the motor housing in a simple manner by means of the elastomeric bearings, and, in particular, no further bearing parts other than the elastomeric bearings are required. The elastomeric bearings can be molded onto the inner face of the motor housing without problems. In addition, assembly is simplified since the motor bearing does not form a separate component but rather is integrated in the motor housing. The elastomeric bearing at least partially decouples the vibrations emanating from the motor from the motor housing.

Overall, vibrations are decoupled in several respects by means of the embodiment according to the disclosure. Firstly, vibrations between the gear mechanism and the motor are at least partially decoupled by means of the interposed unit, said decoupling being active on both sides, with the result that both vibrations or impacts or knocks originating on the gear mechanism side are passed on to the motor only to a reduced extent and, in the opposite direction, motor vibrations are propagated on to the gear mechanism, and therefore on to the tool, only to a reduced extent. This decoupling in the drive train takes place at least in one direction, that is to say either in the axial direction or in the radial direction, but expediently in both directions.

Further effective vibration decoupling is achieved by means of the motor being mounted, this being easy to achieve, by means of the elastomeric bearings. Vibration decoupling is provided between the drive motor and the surrounding motor housing in which the drive motor is mounted.

At least one of the elastomeric bearings is at least in the form of part of a ring and extends in the circumferential direction of the motor housing. If the motor housing is made up of two half-shells, each elastomeric bearing expediently comprises two semicircles, of which in each case one semicircle is provided for each half-shell. In the assembled state, the two semicircles for each elastomeric bearing merge to form a closed circle, and therefore circumferential damping is achieved by means of the elastomeric bearing.

However, it is also possible, in principle, for the elastomeric bearings to have other geometric designs, for example of the kind such that the elastomeric bearings are not circular but rather are limited in the axial and circumferential direction at the point which is to be mounted, and in particular extend only over an angular range of less than 180° in the circumferential direction in the case of motor half-shells, with the result that, rather than a closed circle, only a circular bearing point with interruptions is formed in the assembled state.

In order to achieve a reliable connection between the elastomer which is to be molded on and the motor housing, it may be expedient to mold the elastomeric bearings into housing-side recesses and/or onto housing-side raised portions, as a result of which the resistance to wear by friction and to the risk of the elastomer being accidentally detached from the housing are increased. In the case of a recess in the housing shell of the motor housing, it is also expedient for the elastomer to extend through the motor housing from the inner face to the outer face and to be integrally connected to further elastomeric parts which are located on the outer face of the housing. An integral design of this kind with additional elastomeric sections on the inner wall of the housing also comes into consideration. This design has the advantage in terms of production that, during the molding process, only one common molding point is required in order to apply the elastomer to the inner face and the outer face at the desired points.

The elastomeric bearing can have a radially inwardly directed raised portion on the inner face of the housing, said raised portion forming a contact point for supporting and bearing the drive motor. In this way, the support on an area of reduced size on the elastomeric bearing is reduced, this having the advantage that, on account of the reduced supporting area, the forces required for mounting or joining are reduced since the elastomeric material has to be displaced or compressed only over a relatively small area. For example, in the case of elastomeric bearings in the form of a ring, four raised portions are provided as contact or support points in a manner distributed over the circumference.

It may be expedient to form a stop on the inner face of the motor housing, the elastomeric bearing resting directly against said stop. The stop serves to provide axial support for the mounted motor, with the elastomeric bearing being situated between the motor and the stop on the housing in the mounted position and thereby being able to deploy its damping effect.

According to a further expedient embodiment, at least one of the elastomeric bearings is connected to an insertion bevel which extends in the axial direction and is likewise composed of elastomeric material and is molded onto the inner face of the housing. The insertion bevel is therefore integrally formed with the elastomeric bearing. The insertion bevel allows the motor to be axially inserted more easily as far as the final mounting position.

A thermoplastic elastomer is preferably used as the elastomeric material, said thermoplastic elastomer having the vibration-damping properties required for bearing the motor.

According to a preferred embodiment, the unit which is arranged between the drive motor and the gear mechanism is in the form of a fan unit which comprises a fan impeller, with a toothed sleeve expediently being mounted on the motor shaft of the drive motor, said toothed sleeve driving the fan impeller. In this case, the toothed sleeve on the motor shaft and the fan impeller are coupled in such a way that there is at least axial play, but possibly also radial play, between the toothed sleeve and the fan impeller, as a result of which vibrations can be decoupled in the axial and radial directions. Particularly in the case of axial play between the toothed sleeve and the fan impeller, vibrations and impacts which act in the axial direction are transmitted between the gear mechanism and the motor only to a reduced extent, with this axial decoupling not restricting the transmission of movement from the motor shaft to the gear mechanism.

BRIEF DESCRIPTION OF THE DRAWINGS

Further advantages and expedient embodiments can be found in the further claims, the description of the figures and the drawings, in which:

DETAILED DESCRIPTION

Identical components are provided with the same reference symbols in the figures.

Figure 1:
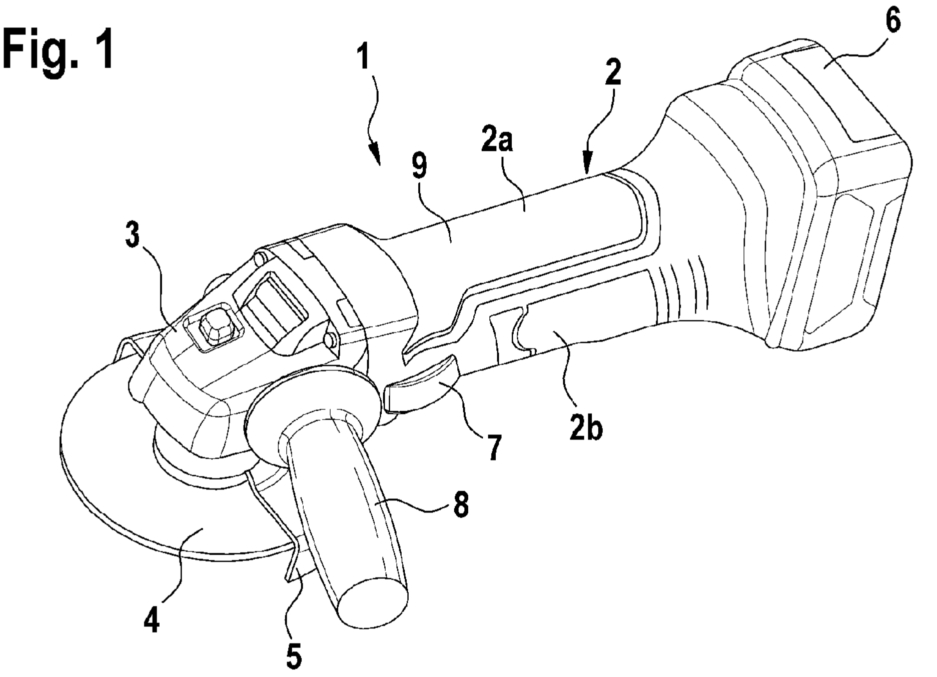
FIG. 1 shows a perspective illustration of an electric hand-held power tool which is designed as a rechargeable battery-powered angle grinder.

The electric hand-held power tool 1 illustrated in FIG. 1 is a rechargeable battery-powered angle grinder having a motor housing 2 for accommodating an electric drive motor, having a gear mechanism housing 3 for accommodating a gear mechanism which is operatively connected to the drive motor, and having a tool 4 which is in the form of a grinding disk. The tool 4 is partially covered by a protective hood 5 which is connected to the housing. Electrical power is supplied by means of a rechargeable battery pack 6 which is arranged in the rear part and adjoins the motor housing 2. A switch 7 for switching on and switching off the electric drive motor is located on the motor housing 2 in the front section which is adjacent to the gear mechanism housing 3. For the purpose of improved control and handling, the outer face of the motor housing is partially provided with a coating comprising an elastomer, in particular a thermoplastic elastomer (TPE). Furthermore, an additional handle 8 is arranged on the housing, said additional handle protruding laterally. The motor housing 2 is of two-part construction and comprises two housing shells 2*a* and 2*b* which are to be fitted to one another.

Figure 2:
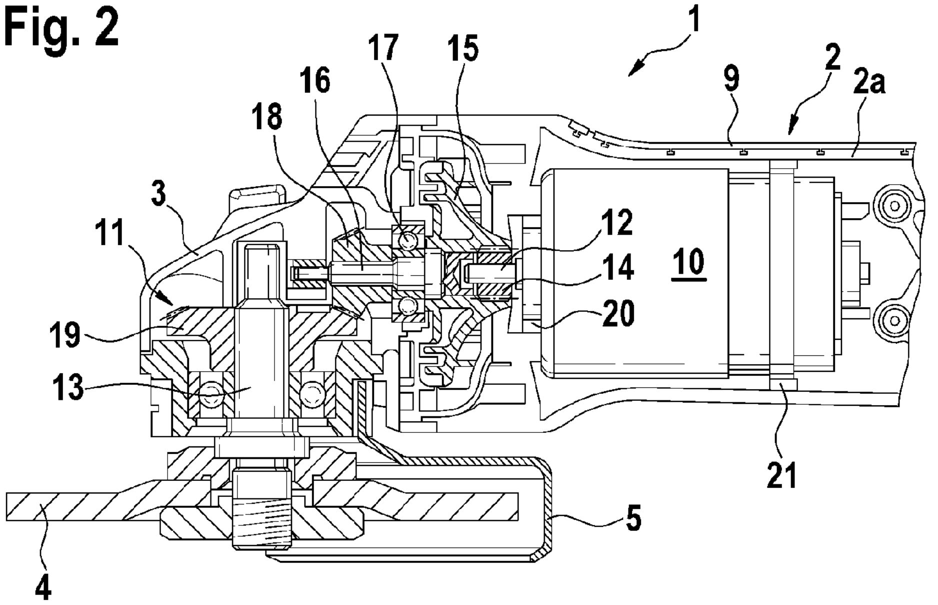
FIG. 2 shows a section through the hand-held power tool.

As can be seen in the sectional illustration according to FIG. 2, the electric drive motor 10 is accommodated in the motor housing 2, said electric drive motor being coupled in terms of movement to the gear mechanism 11 in the gear mechanism housing 3. The gear mechanism 11 drives the output shaft or the tool shaft 13, the tool 4 being detachably fitted to the end face of said output or tool shaft. The tool shaft 13 is orthogonal to the motor shaft 12 of the electric drive motor 10.

Movement is transmitted between the drive motor and the gear mechanism by means of a fan unit which has a fan impeller 15 which is seated on a shaft 16 in a rotationally fixed manner. A toothed sleeve 10 which drives the coaxially arranged fan impeller 15 is pushed onto the motor shaft 12 in a rotationally fixed manner. The engagement between the toothed sleeve 14 and the fan impeller 15 is established in such a way that there is axial play, and possibly additionally also radial play, between said components.

The shaft 16, which is oriented coaxially to the motor shaft 12, is rotatably mounted in the gear mechanism housing by means of ball bearings 17. At that end which is remote from the motor shaft 12, the shaft 16 has a bevel gear 18 which engages with a crown gear 19 which is fixedly connected to the tool shaft 13. The gear mechanism 11 therefore comprises the bevel gear 18 and the crown gear 19.

The electric drive motor 10 is mounted in the motor housing 2 by means of elastomeric bearings 20 and 21 which are molded onto the inner face in the front and rear region of the motor housing 2. The elastomeric bearings 20 and 21 are composed of a thermoplastic elastomer (TPE), the motor is mounted solely by means of the front and the rear elastomeric bearing 20 and, respectively, 21. The elastomeric bearings 20, 21 are each circular and extend in the circumferential direction on the inner face of the motor housing 2.

Figure 3:
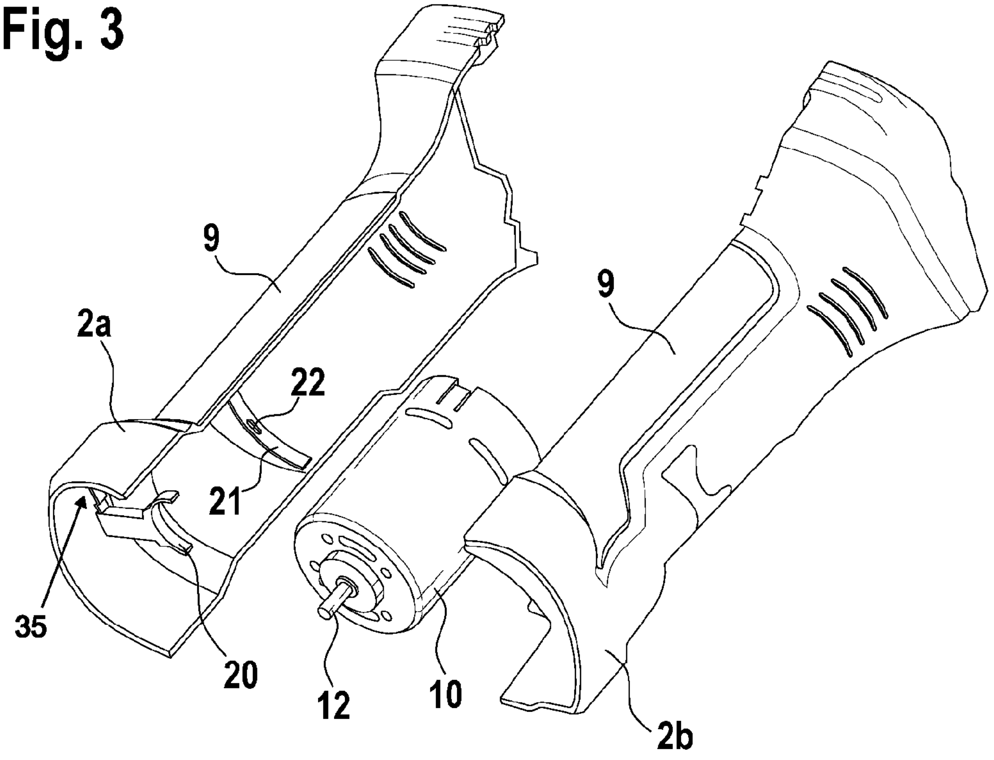
FIG. 3 shows an exploded illustration of two housing shells of the motor housing with an electric drive motor situated between them.

The exploded illustration according to FIG. 3 shows that the front and rear elastomeric bearings 20 and, respectively, 21 are each made up of sections which are in the form of part of a circle for each half-shell 2*a*, 2*b*. In the assembled state, the sections which are in the form of part of a circle each complement one another to form a common front and rear circular elastomeric bearing 20, 21. In this case, consideration is given both to designs in which each section which is in the form of part of a circle describes a semicircle, with the result that an annular elastomeric bearing is achieved overall, and also designs in which the sections extend only over an angular range of less than 180° for each half-shell, with the result that the elastomeric bearings do not form a continuous ring in the assembled state, but rather gaps in the form of angular segments are present between the elastomeric sections which are in the form of part of a ring. Consideration is also given to mixed designs in which only one of the elastomeric bearings is completely annular and the other elastomeric bearing is designed with two sections which are in the form of part of a circle and each have an angular range of less than 180°.

Figure 4:
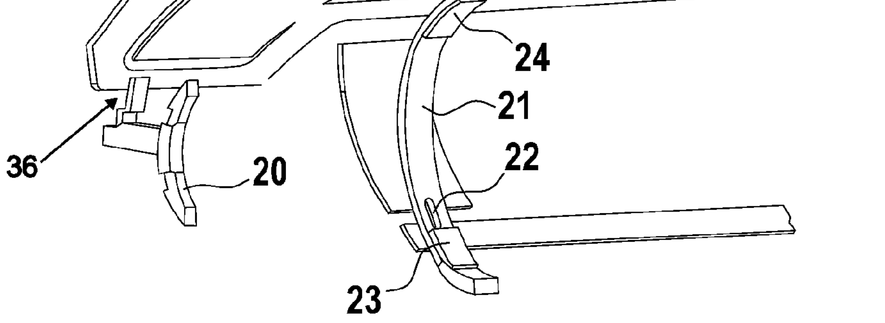
FIG. 4 shows the elastomeric sections on a housing shell illustrated on their own and including two elastomeric bearings which are in the form of part of a ring.

As shown by FIG. 3 in conjunction with FIG. 4, a recess 22 is made in the rear elastomeric bearing 21, a raised portion on the inner face of the motor housing extending through said recess. The elastomeric bearing 21 is molded around the raised portion, as a result of which an improved connection between the molded-on elastomer and the inner face of the housing is achieved.

In this way, a radial stop is formed in the region of the elastomeric bearing, but this stop having an effect only when the device is subject to heavy impacts. The radial stop limits the freedom of movement of the motor in the device. During normal operation, the motor rests only against the elastomeric bearing; in the event of a knock, the motor can briefly also rest against the housing-side stop. After the impact, the motor again rests only against the elastomeric bearing.

As shown in FIG. 4, the radially inwardly facing end of the rear elastomeric bearing 21 which is in the form of part of a ring has raised portions 23 and 24 which are spaced apart from one another and stand out radially inwardly in relation to the rest of the inner face of the elastomeric bearing. These raised portions 23 and 24 form contact points with which the drive motor makes contact in the mounted state. This creates a reduced area of contact between the rear elastomeric bearing 21 and the motor, as a result of which the forces which are required for mounting are reduced.

In a corresponding manner, the front elastomeric bearing 20 can also be equipped with such raised portions which form contact points.

As also shown in FIG. 4, the elastomeric bearings can be intergrally formed with further elastomeric sections. These further elastomeric sections can be applied both to the inner face of the housing and to the outer face of the housing. In order to achieve integral design, for example of the front elastomeric bearing 20 with the coating 9 which is applied to the outer face, the elastomer extends through a recess 35 (FIG. 3) in the housing shell, with the result that an elastomeric connection 36 is established between the inner face and the outer face of the housing.

Figure 5:
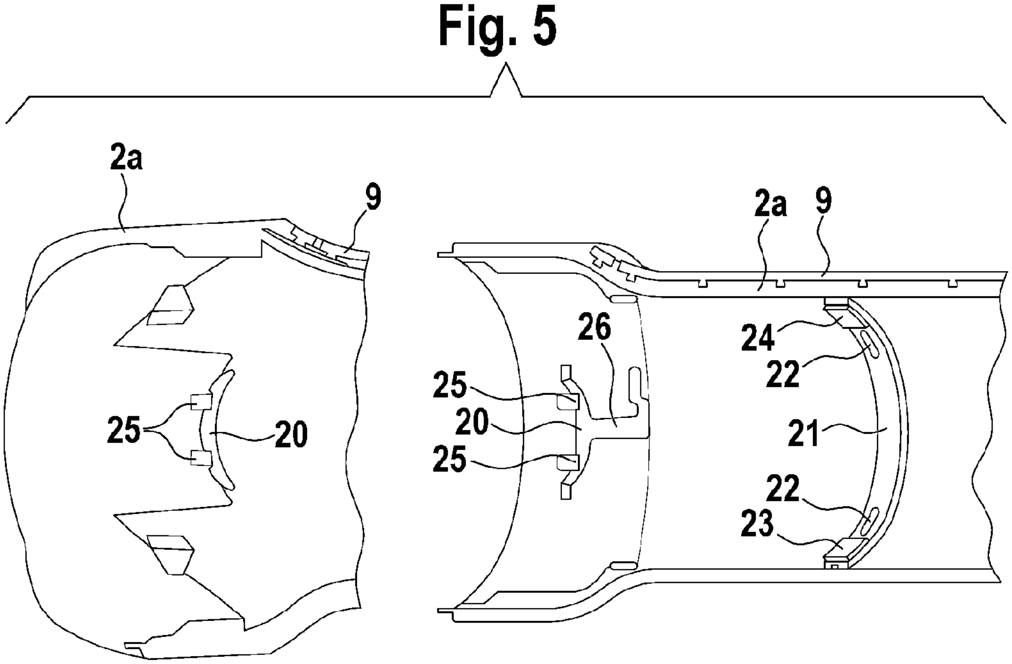
FIG. 5 shows a view of the inner face of the housing of a motor half-shell illustrated from two different perspectives.

FIG. 5 shows two illustrations of the inner face of a housing shell from different perspectives. The front elastomeric bearing 20 is supported against stops 25 axially in relation to the front face of the motor housing, said stops being formed on the inside of the housing. The front elastomeric bearing 20 is pressed against the stops 25 as the drive motor is inserted into the motor housing. The stops 25 also limit the freedom of movement of the motor. In the event of heavy impacts or knocks, the motor can briefly butt directly against the housing-side stops 25, whereas during normal operation the motor rests only against the elastomeric bearing and is not in direct contact with the stops 25.

As shown in the illustration on the right-hand side in FIG. 5, an insertion bevel 26 is integrally formed with the front elastomeric bearing 20, said insertion bevel extending in the axial direction and running from the front elastomeric bearing 20 axially toward the rear, in the direction of the rear elastomeric bearing 21. The insertion bevel is molded into a duct on the inner wall of the motor housing. The insertion bevel 26 has a changing radial component over its axial length and is at a greater radial distance from the center axis or longitudinal axis of the motor at the end which is remote from the front elastomeric bearing 20 than in the region of the front motor bearing. The changing radial component of the insertion bevel 26 is produced, for example, by a changing wall thickness.

Figure 6:
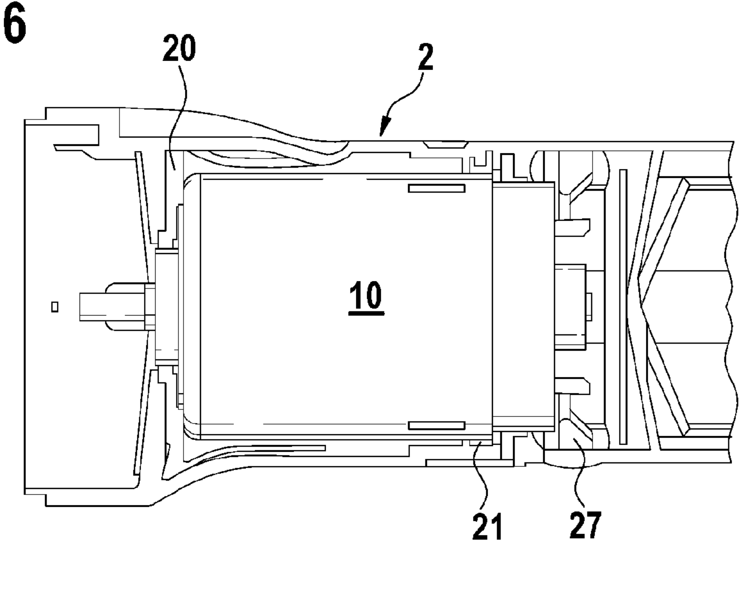
FIG. 6 shows a motor half-shell with an electric drive motor integrated in said motor half-shell.

FIG. 6 illustrates the drive motor 10 in the mounted position in the motor housing 2. The front elastomeric bearing 20 is axially compressed by being acted on by the motor 10, with the axial bearing forces being absorbed by the stop on the inner face of the motor housing. Corresponding stops 27 are also located in the rear part of the motor housing, said stops 27 serving to provide axial support at the rear.

Figure 7:
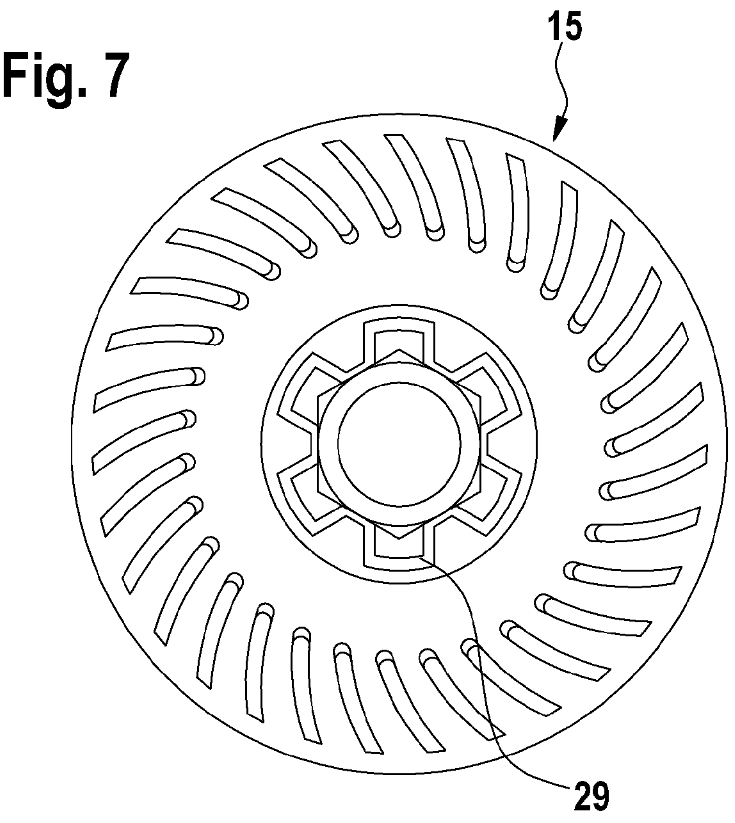
FIG. 7 shows a plan view of a fan impeller which can be installed between the drive motor and the gear mechanism.
Figure 8:
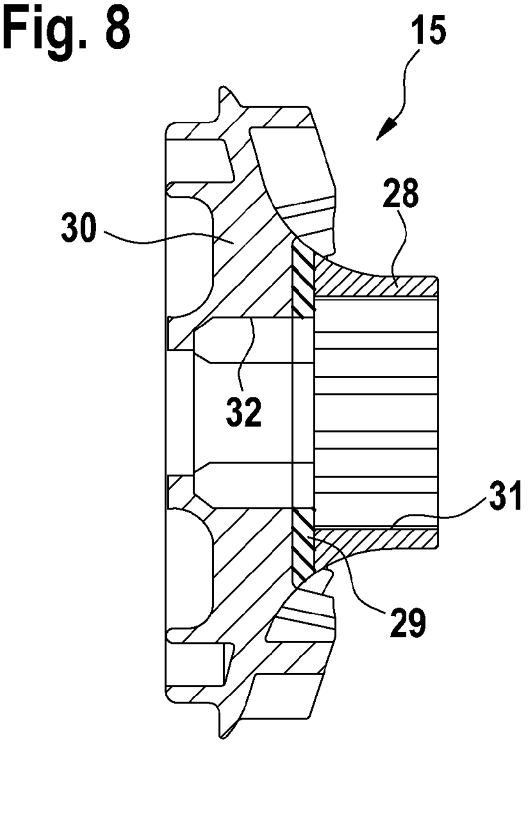
FIG. 8 shows a section through the fan impeller.

FIGS. 7 and 8 show a fan impeller 15 on its own, said fan impeller, in the assembled state, being arranged between the electric drive motor and the gear mechanism and transmitting the drive movement of the electric drive motor to the gear mechanism and further to the tool. A star-shaped elastomeric element 29 is integrated in the fan impeller 15, said star-shaped elastomeric element, as shown in the sectional illustration according to FIG. 8, being arranged between a hub 28 and the main body 30 of the fan impeller. The hub 28 and the main body 30 are connected solely by means of the interposed elastomeric element 29 which is composed, in particular, of a thermoplastic elastomer. The hub 28 has a shaft receptacle 31 in which the toothed sleeve 14 is accommodated in the mounted state. A shaft receptacle 32, which serves to accommodate the bevel gear shaft 16, is likewise integrated in the main body 30. The elastomeric element 29 is therefore situated in the kinematic transmission path between the drive motor and the gear mechanism. At least partial decoupling between the motor and the gear mechanism is achieved by means of the elastomeric element 29, in particular to the effect that deviations in the coaxiality of the drive shaft of the motor and the shaft of the gear mechanism can be compensated for by means of the flexibility of the elastomeric element. The elastomeric element 29 is of flexible design both in the radial direction and in the axial direction. In addition, vibrations are at least damped by means of the elastomeric element 29, with the result that vibrations are likewise at least partially decoupled in the radial direction and in the axial direction.

The invention claimed is:

1. A hand-held power tool, comprising:

a motor housing having an inner face;

a drive motor;

a gear mechanism;

a movement-transmitting unit arranged between the drive motor and the gear mechanism; and at least two elastomeric elements molded onto the inner face of the motor housing, wherein the drive motor and the gear mechanism are at least partially decoupled in an axial direction by an axial play between said movement-transmitting unit and at least one of the drive motor and the gear mechanism at a contact point between said movement-transmitting unit and the at least one of the drive motor and the gear mechanism, and wherein said at least two elastomeric elements are configured to form elastomeric bearings that support the drive motor in the motor housing.

2. The hand-held power tool as claimed in claim 1, wherein the drive motor is mounted in the motor housing solely by the at least two elastomeric bearings.

3. The hand-held power tool as claimed in claim 1, wherein at least one of the at least two elastomeric bearings is configured at least in the form of part of a ring and extends in the circumferential direction of the motor housing.

4. The hand-held power tool as claimed in claim 1, wherein one of the at least two elastomeric bearings has raised portions on a side which faces the drive motor, said raised portions forming contact points for supporting the drive motor.

5. The hand-held power tool as claimed in claim 1, wherein:

the motor housing comprises two half-shells, and each of the at least two elastomeric bearings comprises two sections which are in the form of part of a ring, and each of the two sections is arranged in each half-shell of each of the at least two elastomeric bearings.

6. The hand-held power tool as claimed in claim 1, further comprising additional elastomeric sections molded onto the motor housing, wherein:

at least one of the at least two elastomeric bearings is connected to the additional elastomeric sections.

7. The hand-held power tool as claimed in claim 6, further comprising elastomeric material, wherein:

the motor housing has recesses through which the elastomeric material passes, and the at least one of the at least two elastomeric bearings is connected to said elastomeric material.

8. The hand-held power tool as claimed in claim 1, wherein:

the inner face of the housing includes a recess or a raised portion, and at least one of the at least two elastomeric bearings is molded into the recess or the raised portion.

9. The hand-held power tool as claimed in claim 1, wherein at least one of the at least two elastomeric bearings bears against a housing-side stop in the axial direction.

10. The hand-held power tool as claimed in claim 1, wherein at least one of the at least two elastomeric bearings is connected to an insertion bevel which extends in the axial direction and includes elastomeric material.

11. The hand-held power tool as claimed in claim 1, wherein at least one of the at least two elastomeric bearings includes a thermoplastic elastomer.

12. The hand-held power tool as claimed in claim 1, wherein the movement-transmitting unit comprises a fan unit having a fan impeller.

13. The hand-held power tool as claimed in claim 12, further comprising a toothed sleeve mounted on a motor shaft of the drive motor, wherein said toothed sleeve is configured to drive the fan impeller with the toothed sleeve, and wherein the fan impeller is coupled in terms of movement with axial and/or radial play.

14. The hand-held power tool as claimed in claim 12, further comprising an additional elastomeric element integrated in the fan impeller.

15. The hand-held power tool as claimed in claim 12, further comprising an additional elastomeric element, wherein:

the fan impeller includes a hub and a main body, and the additional elastomeric element is arranged in the fan impeller between the hub and the main body.

16. The hand-held power tool as claimed in claim 1, wherein the at least two elastomeric elements are integrally molded onto the inner face of the motor housing.

17. The hand-held power tool as claimed in claim 1, wherein the drive motor and the gear mechanism are at least partially decoupled in a radial direction by a radial play between said movement-transmitting unit and at least one of the drive motor and the gear mechanism at the contact point between said movement-transmitting unit and the at least one of the drive motor and the gear mechanism.

18. The hand-held power tool as claimed in claim 1, wherein a first elastomeric element of the at least two elastomeric elements is positioned in contact with a first region of the drive motor, which is proximate to the gear mechanism, and a second elastomeric element of the at least two elastomeric elements is positioned in contact with a second region of the drive motor, which is remote from the gear mechanism.

* * * * *